US012800128B2

(12) United States Patent
Kakkar et al.

(10) Patent No.: US 12,800,128 B2
(45) Date of Patent: Nov. 17, 2026

(54) NON UNIFORM LED PLACEMENT IN RGB MULTI-OPTICS

(71) Applicant: Lumileds LLC, San Jose, CA (US)

(72) Inventors: Varun Dev Kakkar, Eindhoven (NL); Rob Jacques Paul Engelen, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 19/137,769

(22) PCT Filed: Dec. 12, 2023

(86) PCT No.: PCT/US2023/083670
§ 371 (c)(1),
(2) Date: Jun. 11, 2025

(87) PCT Pub. No.: WO2024/129759
PCT Pub. Date: Jun. 20, 2024

(65) Prior Publication Data

US 2026/0085813 A1 Mar. 26, 2026

Related U.S. Application Data

(60) Provisional application No. 63/433,075, filed on Dec. 16, 2022.

(51) Int. Cl.
*F21V 7/00* (2006.01)
*F21Y 113/17* (2016.01)
*F21Y 115/10* (2016.01)

(52) U.S. Cl.
CPC ......... *F21V 7/0091* (2013.01); *F21Y 2113/17* (2016.08); *F21Y 2115/10* (2016.08)

(58) Field of Classification Search
CPC ........................... F21V 7/0091; F21Y 2113/17
See application file for complete search history.

(56) References Cited

U.S. PATENT DOCUMENTS 7,554,625 B2 * 6/2009 Koganezawa .... G02F 1/133603 349/67
7,806,558 B2 * 10/2010 Williamson ....... G03B 21/2013 362/249.02

(Continued)

FOREIGN PATENT DOCUMENTS

EP 2083211 A1 7/2009
WO WO-2019175389 A1 * 9/2019 .............. F21V 5/007
WO WO-2024129759 A1 6/2024

OTHER PUBLICATIONS

"International Application Serial No. PCT/US2023/083670, International Search Report mailed Apr. 17, 2024", 4 pgs.

(Continued)

*Primary Examiner* — Matthew J. Peerce
(74) *Attorney, Agent, or Firm* — Schwegman, Lundberg & Woessner, P.A.

(57) ABSTRACT

An illumination apparatus is provided to correct for chromatic aberration. A light-emitting diode (LED) structure has multiple LED clusters and an optic associated with each cluster. Each cluster is disposed in a cavity in a different total internal reflectance (TIR) structure. Each cluster contains individual LEDs that are configured to emit light of a different color toward the optic. In each cluster: a center of at least one LED within the cluster is disposed at a different distance from a center of the cluster than a center of at least one other LED within the cluster dependent on a wavelength dependence of the optic. For each color, an average position of the LEDs configured to emit the color within the clusters and an average position of the LEDs configured to emit each other color within the clusters are identical.

20 Claims, 10 Drawing Sheets

(56) References Cited

U.S. PATENT DOCUMENTS

| | | | | |
|---|---|---|---|---|
| 2009/0147508 | A1 * | 6/2009 | Bertram | F21K 9/00 362/231 |
| 2009/0316393 | A1 | 12/2009 | Vissenberg et al. | |
| 2017/0167668 | A1 | 6/2017 | Uenoyama et al. | |
| 2018/0192484 | A1 | 7/2018 | Stopa et al. | |
| 2022/0128219 | A1 | 4/2022 | Frankiewicz et al. | |
| 2022/0328458 | A1 * | 10/2022 | Chen | H10H 29/142 |

OTHER PUBLICATIONS

"International Application Serial No. PCT/US2023/083670, Written Opinion mailed Apr. 17, 2024", 9 pgs.

* cited by examiner

NON UNIFORM LED PLACEMENT IN RGB MULTI-OPTICS

PRIORITY CLAIM

This application is a U.S. National Stage Filing under 35 U.S.C. 371 from International Application No. PCT/US2023/083670, filed Dec. 12, 2023 and published in English as WO 2024/129759 on Jun. 20, 2024, which claims the benefit of priority to U.S. Provisional Patent Application Ser. No. 63/433,075, filed Dec. 16, 2022, each of which is incorporated herein by reference in its entirety.

FIELD OF THE DISCLOSURE

The present disclosure relates to an illumination apparatus that contains light-emitting diodes (LEDs). In particular, embodiments are directed to control of control of color mixing in the illumination apparatus.

BACKGROUND OF THE DISCLOSURE

There is ongoing effort to improve illumination systems. In particular, it is desirable to improve color mixing within an illumination apparatus containing multi-color LEDs.

DETAILED DESCRIPTION

Luminaires and other illumination apparatuses with multicolor output are becoming increasingly popular, replacing single color (white light) luminaires. In such arrangements, LEDs of multiple colors (e.g., red, green, blue, cyan, amber etc.) may be placed together to produce various colors by controlling the output from each LED color. The colors can be controlled via local (wall) or remote controls as above. The use of LEDs of different colors in combination with secondary optics may be used to achieve a desired color, luminous flux, and light beam size of the luminaire. However, uniform mixing of the different color LEDs when using secondary optics may be highly challenging. For example, light emitted by red, green and blue LEDs tend to have a slightly different beam aspects due to chromatic aberrations and positioning of the light source with respect to the secondary optics (focal plane issues), among others.

Figure 1:
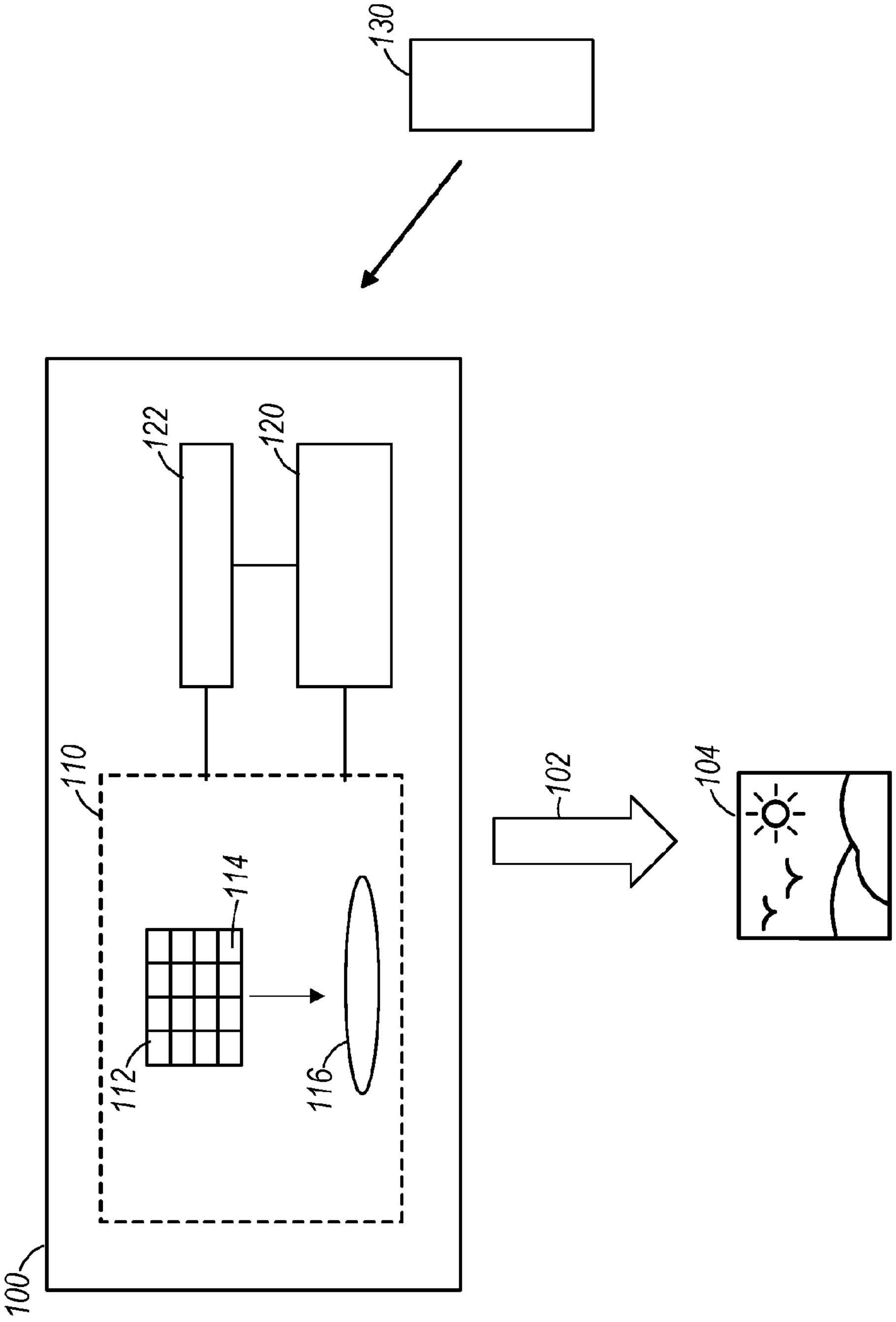
FIG. 1 shows an illumination apparatus, in accordance with some examples.

FIG. 1 shows an illumination apparatus 100, in accordance with some examples. The illumination apparatus 100 may be, for example, a luminaire that contains a light engine 110 that produces light 102 to illuminate an illuminated region 104.

The light engine 110 can be used for a variety of different applications, such as indoor and/or outdoor lighting, signage, signals, emergency vehicle lighting, luminaires, pedestrian lights, pole lights, and other applications. The light engine 110 may contain a number of elements connected together with connectors, such as screws or other mechanical fasteners, or, for example, chemical fasteners such as adhesives.

A processor 120 may be used to control various functions of the light engine 110. The illumination apparatus 100 may include one or more LED arrays 112. Each of the one or more LED arrays 112 may include a plurality of LEDs 114 that may produce light. Each of the one or more LED arrays 112 may contain LEDs 114 that are segmented LEDs or microLEDs.

The LEDs 114 may be mounted on one or more printed circuit boards (PCBs), which may be planar or disposed in another shape. In some embodiments, a light guide plate (LGP) can be positioned to spread the light from the LEDs 114 prior to emission from the illumination apparatus 100. In some embodiments, a reflector may be positioned to reflect light (e.g., from the LGP) towards the illuminated region 104.

Each of the LEDs 114 may be formed from one or more inorganic materials (e.g., binary compounds such as gallium arsenide (GaAs), ternary compounds such as aluminum gallium arsenide (AlGaAs) or indium gallium nitride (InGaN), quaternary compounds such as indium gallium arsenide phosphide (InGaAsP) or aluminum indium gallium phosphide (AlInGaP), or other suitable materials), which are more robust than organic LEDs, allowing use in a wider variety of environments. Each of the LEDs 114 may emit light in the visible spectrum (about 400 nm to about 800 nm). In some embodiments, one or more other layers, such as a phosphor layer may be disposed on each of the one or more LED arrays 112. LEDs 114 in a particular LED array 112 that emit light of one of the colors may be, for example, interspersed with LEDs 114 that emit light of different colors, or each LED 114 that emits a different color may be disposed on different sections of the particular LED array 112. Alternatively, each LED array 112 may contain LEDs that emit only light of a single color. In some embodiments, each of the individual LED arrays 112, LEDs 114 and/or LED segments may be driven by one or more drivers 122 that are controlled by the processor 120.

The processor 120 may additionally control and drive the LEDs 114 in the one or more LED arrays 112 via one or more drivers 122. For example, the processor 120 may optionally control one or more LEDs 114 in the one or more LED arrays 112 independent of another one or more LEDs 114 in the one or more LED arrays 112, so as to illuminate the illuminated region 104 in a specified manner. The LEDs 114 may be driven using a direct current (DC) driver or pulse width modulation (PWM).

In some embodiments, each of the one or more LED arrays 112 may include LEDs of typical size (e.g., >1 mm on a side). In other embodiments, each of the one or more LED arrays 112 may be a micro-LED array that includes thousands to millions of microscopic LEDs 114 that may emit light and that may be individually controlled or controlled in groups of pixels (e.g., 5×5 groups of pixels). MicroLEDs are small (e.g., <0.01 mm on a side) and may provide monochromatic or multi-chromatic light, typically red, green, or yellow using inorganic semiconductor material such as that indicated above.

The light engine 110 may include at least one lens 116 and/or other optical elements such as reflectors. The lens 116 and/or other optical elements may direct the light emitted by the one or more LED arrays 112 toward the illuminated region 104 as light 102. In various embodiments, a single lens 116 may be provided for the one or more LED arrays 112, one or more lenses 116 may be provided for each of the one or more LED arrays 112 (e.g., in the latter case, for subsets of LEDs 114 within a particular LED array 112) or a combination thereof among different LED arrays 112, or a lens 116 may be provided for each LED 114 in each of the one or more LED arrays 112. The lens 116 may be formed from a transparent optical material with a refractive index>1.

The illumination apparatus 100 may also include one or more input devices, for example, user-activated input devices such as buttons or sliders. Alternatively, or in addition, such user-activated input devices may be provided on a remote control 130, which may be a specialized device tailored to the illumination apparatus 100 or an application for an electronic device, such as a mobile device (e.g., smartphone).

The use of the LEDs 114 rather than conventional lighting sources may allow the light engine 110 to be built with multiple smaller modules of LEDs and thus increase luminous flux of the luminaire. As above, secondary optics (such as the lens 116) may be used to shape the output beam of the luminaire to increase efficiency by changing the size of the light emitting area and/or directing the light 102 towards the desired illuminated region 104. For example, narrow spots may be adjusted to wide floodlight beams depending on the desired application. Alternatively, the optic may be used to collimate the light from the LEDs 114 impinging thereon.

Figure 2:
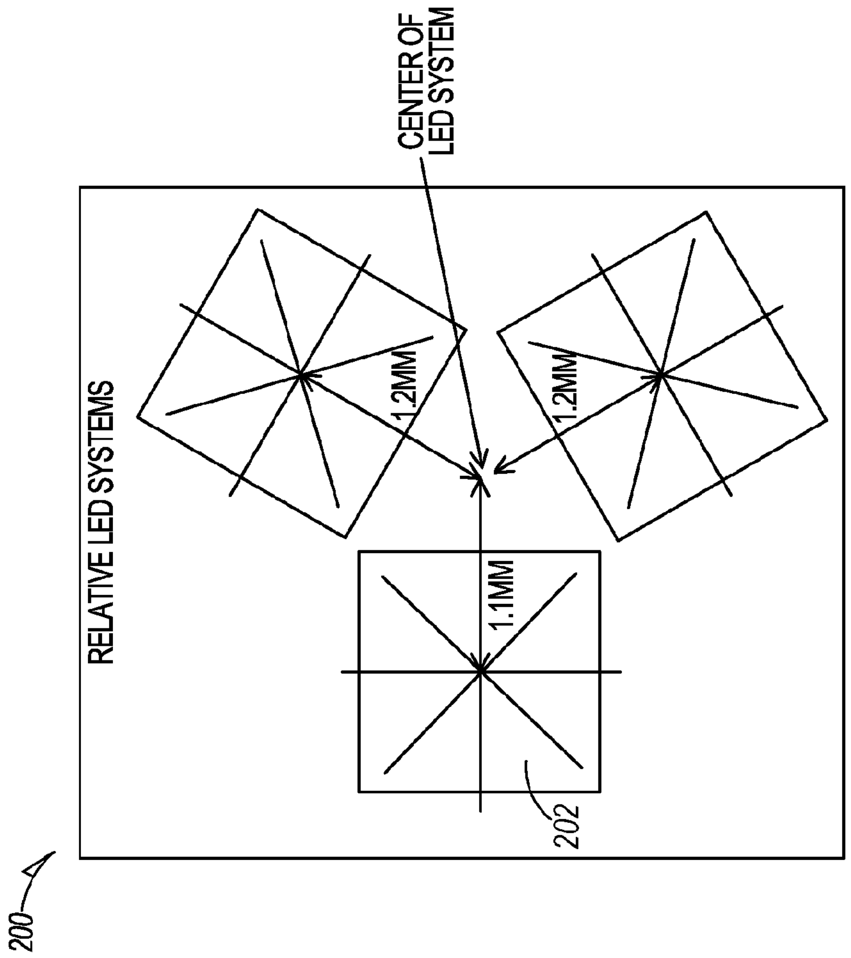
FIG. 2 illustrates LEDs under a single optic, in accordance with some examples.

FIG. 2 illustrates LEDs under a single optic, in accordance with some examples. When placing multiple color LEDs 202 under a single optic (referred to herein as a LED module 200 or LED cluster), the output beam centroid may differ for each LED 202 due to the different positions under the optic. In some embodiments, the LEDs 202 may be disposed substantially symmetrically around a center of the LED module 200. As shown in FIG. 2, the centers of the LEDs 202 may be disposed such that lines from one of the centers to the others of the centers form an angle of about 120° (360°/number of LEDs), or the area between the LEDs 202 (which are rectangular) may essentially form a triangular shape as shown. Each LED 202 in the embodiments described herein may be an LED array instead of a single LED.

In some aspects, the centers of the LEDs 202 may be disposed equidistant from the center of the LED module 200. However, due to the above issues of chromatic aberration and focal plane-related issues, it may not be desirable for the LEDs 202 to be disposed substantially symmetrically around the center of the LED module 200; that is, the LEDs 202 (and thus centers of the LEDs 202) may not be disposed equidistant from the center of the LED module 200. Thus, as shown in the embodiment of FIG. 2, the center of two of the LEDs 202 in the cluster may be disposed about equidistant (1.2 mm) from the center of the LED module 200 while the center of the remaining LED 202 in the cluster is disposed at a shorter distance (1.1 mm) from the center of the LED module 200. In other embodiments, the center of the remaining LED 202 may be disposed at a longer distance from the center of the LED module 200 than the other LEDs 202. Alternatively, all three of the LEDs 202 may be disposed at different distances from the center of the LED module 200. The difference in the distance from the center of the LED module 200 may be able to be determined based on modeling of the optic characteristics with regard to the wavelengths emitted by the LEDs 202 and, as described herein, the height of the LEDs 202. In some embodiments, the relative distances (or the difference of the distance of each LED 202 from the center of the LED module 200) may thus be dependent on the wavelength dependence of the optic, which may be substantially identical throughout the optic. In some embodiments, the center of the LED module 200 may be aligned with an axis of symmetry of the optic, such as the center of the optic.

Further, in order to mix the light due to different centroids of the LEDs 202 of different colors, multiple LED modules 200 may be disposed in a single luminaire or other lighting structure. In a number of implementations, the LEDs 202 may have a rectangular package (as shown in FIG. 2) and the light emitting die/chip may be off-center in such a package. The term "centroid" is accordingly used herein to mean the centroid of the light emitting area of the LED 202 rather than the centroid of the package center. In this case, as discussed in more detail herein, the color LEDs 202 may have different relative positions in each module; that is, the relative color LED positions may be interchanged between LED modules 200. Moreover, within a multi-optic system (e.g., one for each LED module 200), the LED module 200 may (or may not) be rotated around the axis of symmetry (e.g., optical center) of the optic (e.g., where each lens has different rotation of the LED module 200 with respect to a vertical axis passing through a center of the lens and a center of the LED module 200). Using such variations, when an average position is assigned relative to the optic for every color LED 202, the average position of the different colors over all of the optics may be substantially identical for every color, thereby reducing potential color artifacts in the aggregate output beam.

In other embodiments, multiple LEDs 202 of each color may be disposed in each LED module 200. In this case, each cluster of LEDs 202 (as shown, one LED 202 of each color) in a particular LED module 200 may have a different orientation, with the relative distances of the LEDs 202 from the center of the cluster remaining the same for each cluster. In other embodiments, additional LEDs 202 may be present and/or LEDs 202 of identical colors may be present.

Another parameter that may affect the relative placement of the LEDs 202 within the LED module 200 may be the height difference between the LEDs 202. That is, different color LEDs 202 may have different thicknesses (or height) on the chips on which the LEDs 202 are fabricated.

Figure 3A:
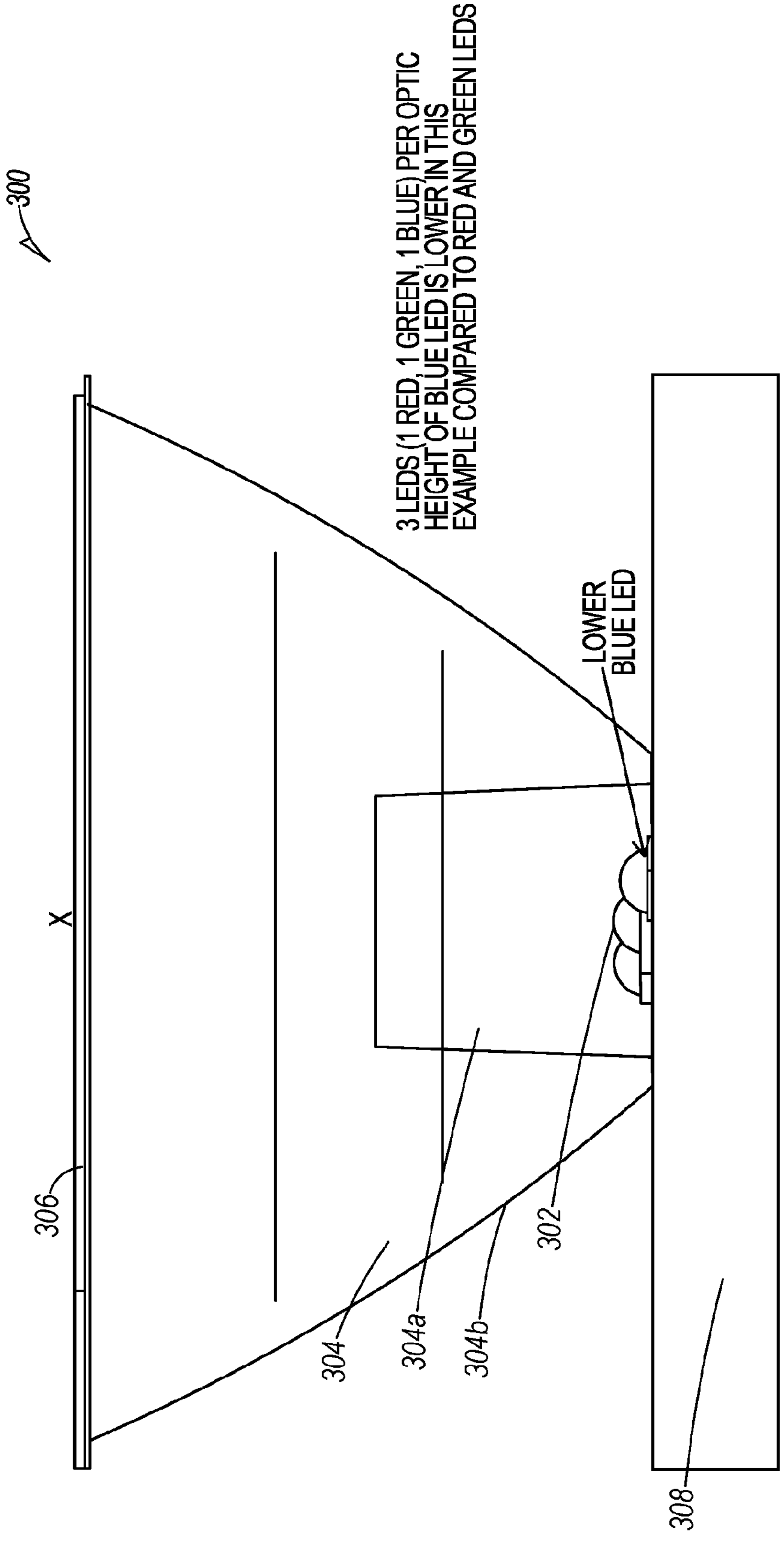
FIG. 3A illustrates an LED module arrangement, in accordance with some examples.
Figure 3B:
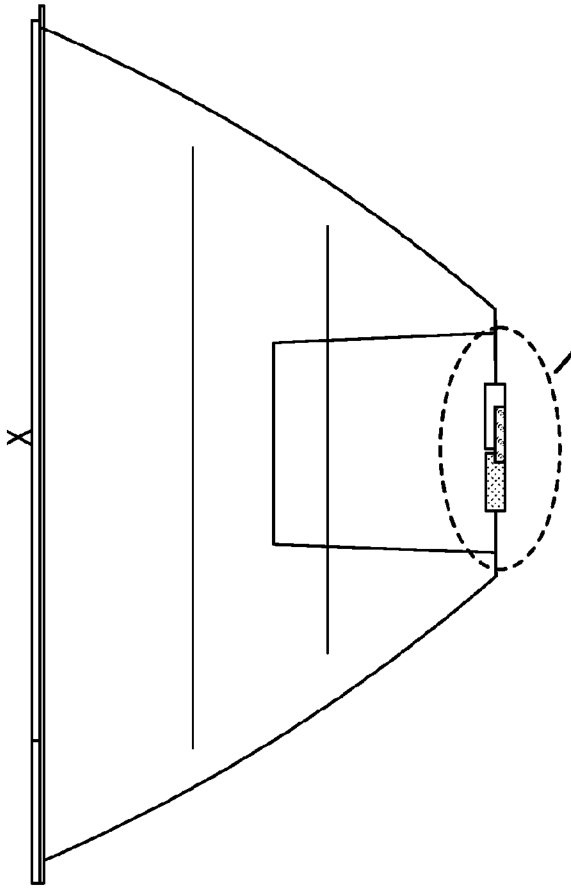
FIG. 3B illustrates a wireframe of the LED module arrangement of FIG. 3A, in accordance with some examples.
Figure 3C:
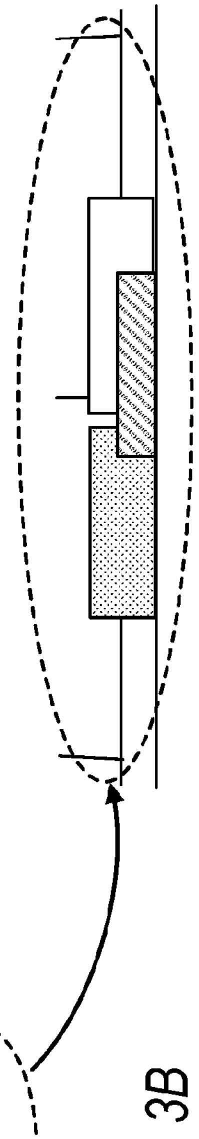
FIG. 3C illustrates an enhanced view of the wireframe of the LEDs in the LED module arrangement of FIG. 3A, in accordance with some examples.
Figure 3D:
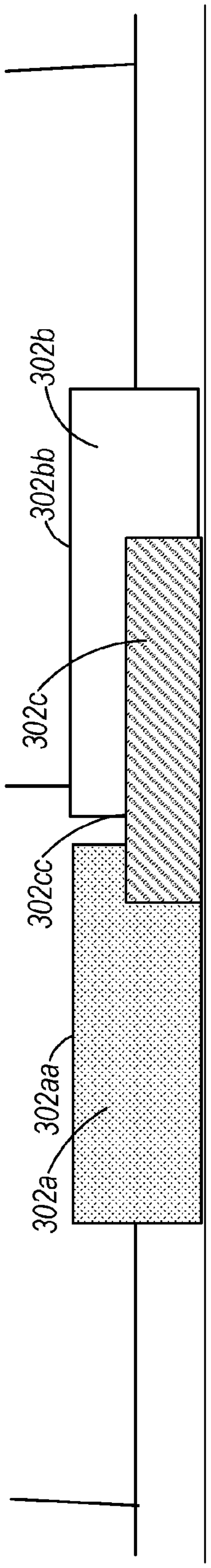
FIG. 3D illustrates an enlarged view of the wireframe of the LEDs in the LED module arrangement of FIG. 3A, in accordance with some examples.

FIG. 3A illustrates an LED module arrangement, in accordance with some examples. FIG. 3B illustrates a wireframe of the LED module arrangement of FIG. 3A, in accordance with some examples. FIG. 3C illustrates an enhanced view of the wireframe of the LEDs in the LED module arrangement of FIG. 3A, in accordance with some examples. FIG. 3D illustrates an enlarged view of the wireframe of the LEDs in the LED module arrangement of FIG. 3A, in accordance with some examples. The LED module arrangement 300 may include LEDs 302 of different colors disposed within a cavity 304*a* of a total internal reflectance (TIR) structure 304. The TIR structure 304 may be formed, for example, from glass or a material that is substantially transparent to the light emitted by the LEDs 302.

The sidewalls 304*b* of the TIR structure 304 are angled such that light from the LEDs 302 emitted into the cavity 304*a* and impinging on the sidewalls 304*b* is subject to TIR to remain within the TIR structure 304 and be directed to one or more optics 306. The difference between the indices of refraction of the TIR structure 304 and the ambient air may cause TIR of the light from the LEDs 302 emitted into the cavity 304*a* and impinging on the sidewalls 304*b*. Alternatively, or in addition, a reflective layer or structure may be added to the sidewalls 304*b* of the TIR structure 304 to reflect light from the LEDs 302 impinging on the sidewalls 304*b* to remain within the TIR structure 304. Such a reflective layer may be formed from an optically opaque material (e.g., metal) or from a Bragg reflective structure that is reflective at the optical wavelengths (or at least those emitted by the LEDs 302). The Bragg reflective structure may be formed from interleaved layers of substantially transparent dielectric materials with different refractive indices and perhaps thicknesses.

As shown in FIGS. 3A-3D, multiple LEDs 302 of different colors are disposed on a substrate 308 such as a PCB under a single optic 306. In some embodiments, the optic 306 may be integral with the TIR structure 304. Alternatively, the TIR structure 304 may have an opening in an exit surface for a separate optic 306 to be disposed (and retained) in a recess therein. A transparent adhesive or retaining mechanism (such as clamps) may be used to retain the optic 306. The light from the LEDs 302 is directed to the exit surface via TIR for transmission from the LED module arrangement 300. The optic 306 may be formed from glass, for example, or another material that shapes light passing therethrough. The optic 306 may have a focal length corresponding to the emission surface of one or more of the LEDs 302. In embodiments in which the LEDs 302 have different heights, the optic 306 may have a focal length between the emission surfaces of the LEDs 302 (e.g., at a mean of the distances between the optic 306 and the emission surfaces of the LEDs 302).

In some embodiments, anti-reflection (and/or other) coatings may be provided on the optic 306. In other embodiments, a reflective structure may be used rather than using a TIR structure, e.g., a reflective coating may be disposed on an inner surface of the (frustoconical) structure or a reflective structure made, for example, of metal may be used rather than using TIR structure. The use of a reflective structure may increase the range of acceptable angles of the structure, as well as materials to use to create the structure. In addition, formation of a separate cavity may be avoided when a reflective structure is used.

When used with optics, the height of the LED 302 determines the position of the light emitting surface with respect to the optics (or focal point of the optics). This may be significant in particular for narrow beam applications. For example, red color LEDs may be thicker than blue and green color LEDs due to the LED architecture. As an example, doped InGaN can be used to produce blue and green LEDs, while doped AlInGaP may be used to produce red LEDs. However, the electrical contacts to the doped InGaN may be disposed at the bottom of the chip, while the electrical contacts to doped AlInGaP may be disposed at the top of the chip; this may make the height of the LED higher compared to blue and green. The difference in the height of different LEDs may result in different beam widths emitted from the optics for that color and hence poor color mixing at the target surface. Height and thickness are defined in the direction from the substrate 308 to the optic 306. The height of the LED 302 may be measured from the surface of the LED 302 most proximate to the substrate 308 to the opposing surface of the LED 302 most proximate to the optic 306.

This is shown in FIGS. 3A-3D: the LEDs 302 may not be of uniform height on the substrate 308; that is, the emission surfaces of the LEDs 302 may not be planar. In particular, while two of the LEDs 302 of different colors (red LED 302*a* and green LED 302*b*) are shown in FIGS. 3A-3D as having emission surfaces (red LED emission surface 302*aa* and green LED emission surface 302*bb*) that are substantially planar with each other, the blue LED 302*c* has a blue LED emission surface 302*cc* that is substantially lower than the red LED emission surface 302*aa* and green LED emission surface 302*bb*. Other potential reasons for non-uniformity in the nominal positions shown in FIGS. 3A-3D may include chromatic aberrations, different die sizes, different radiation patterns for each color, and color-over-angle of the LEDs 302, among others.

Thus, different heights of multi-color LEDs (i.e., 2 or more colors) shown in FIGS. 3A-3D and other issues may be compensated for in some embodiments to correct an output beam that suffers from chromatic aberrations due to the issues. The different color LEDs 302 may be clustered (in the above LED module) to form a light emitting surface (LES) under the optic 306 that is configured to shape the outgoing beam. The light emitting surface may contain all color LEDs distributed uniformly thereon. In addition to differences in the LED heights, the optic 306 may have wavelength-dependent transmission properties, which makes different colors behave differently or make different beam angles. The optic 306 may be formed from a material having the wavelength-dependent transmission properties or may be formed from a material having substantially wavelength-independent transmission properties and one or more layers having wavelength-dependent transmission properties may be disposed on the material having wavelength-independent transmission properties. The result is that the output beam from the LED module arrangement 300 associated with different color shades may be different due to the different beam angles of different colors.

Thus, one parameter that can be used to compensate for wavelength dependency is height of the LED. Although this can also be used as tuning parameter for optimizing beam uniformity, it may, however, be relatively difficult to change the height of the LED itself, instead, additional components may be provided to provide such a height differential. For example, one or more additional structures may be used to increase height of a particular LED. That is, the additional structures (such as PCBs) may be disposed only under the thinner LED to enable electrical contact to the underlying PCB while adjusting the height. Taking the example of direct color LEDs shown in FIGS. 3A-3D, the blue and green LEDs are normally lower in height (direct die emission LEDs) compared to red or phosphor-converted LEDs. As above, this may further cause color errors in the beam.

Figure 4:
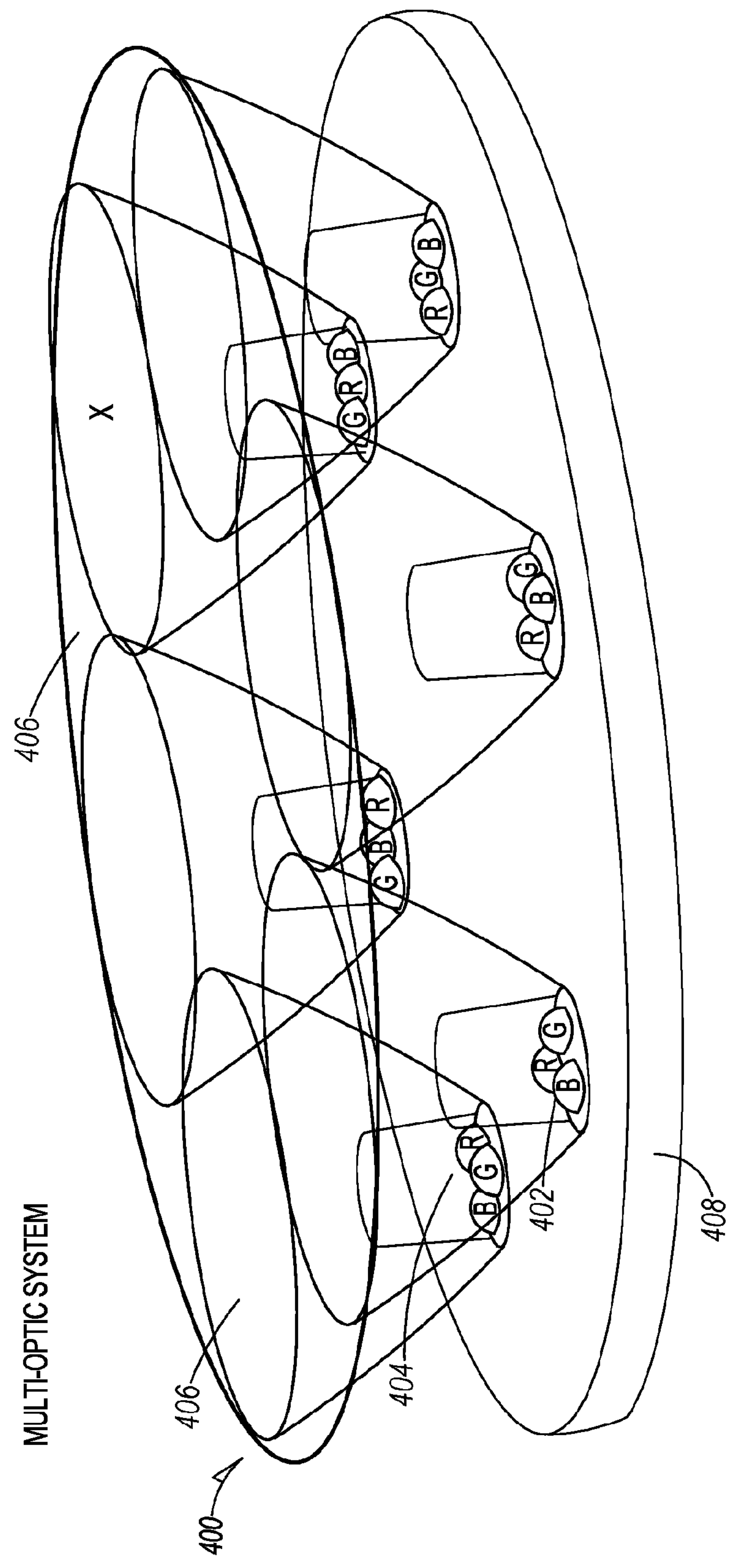
FIG. 4 illustrates a multi-optic LED system, in accordance with some examples.

FIG. 4 illustrates a multi-optic LED structure, in accordance with some examples. As shown in the structure 400 of FIG. 4, multiple LEDs 402 of different colors form an LED module 404 disposed on a substrate 408 under a single optic 406. As shown, the structure 400 of FIG. 4 contains multiple LED modules 404 and multiple optics 406, each corresponding to a different LED module 404, that are disposed within a housing. A cover 410 may be disposed over the entirety of the structure 400 to the optic 406 to protect each optic 406 and/or provide additional optical effects such as dispersion. The cover 410 may be thus formed by a substantially transparent or translucent material to the wavelengths emitted by the LED module 404.

Figure 5:
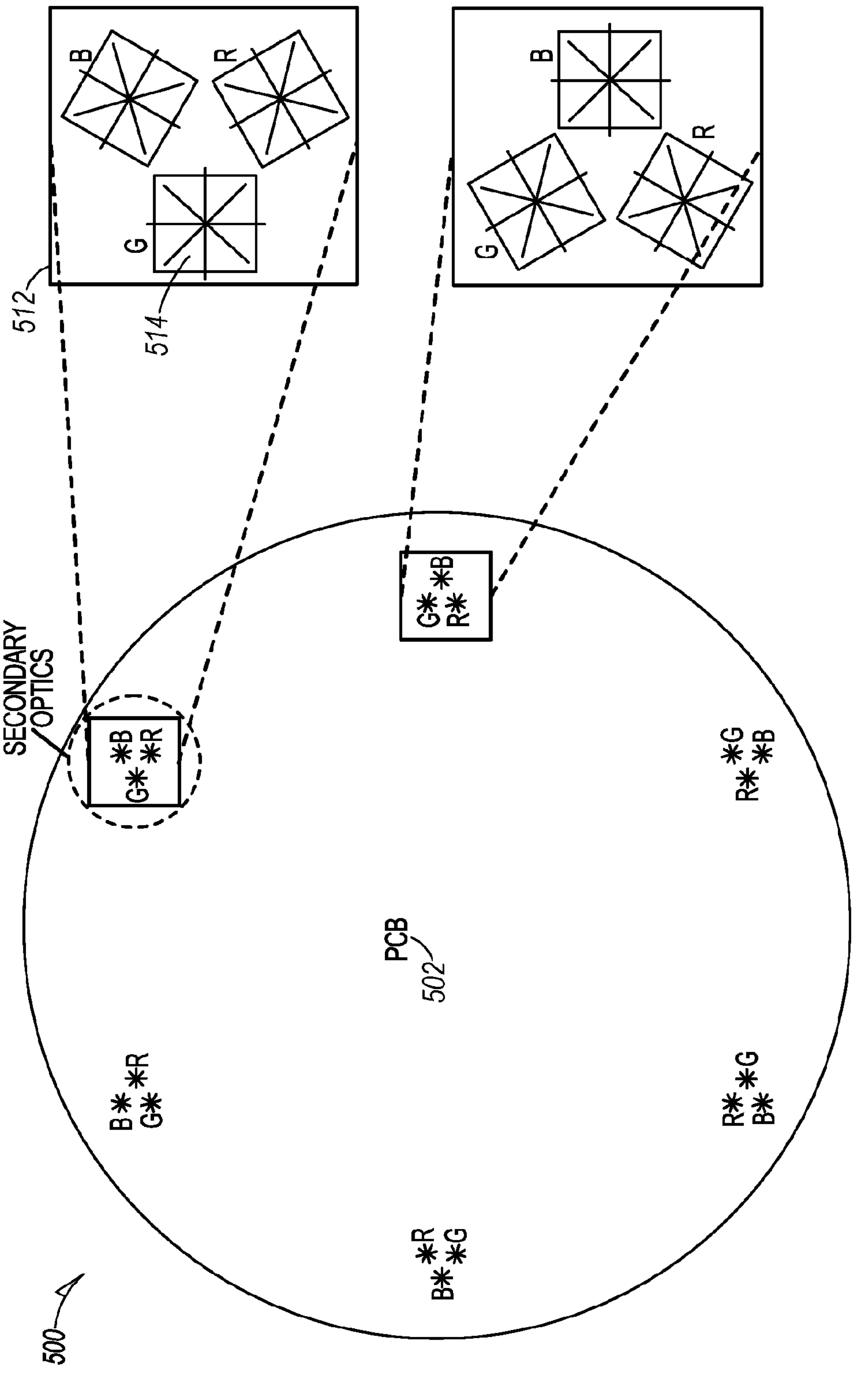
FIG. 5 illustrates top view of a luminaire, in accordance with some examples.

As above, the different beam angles (and hence color non-uniformity) and heights may be mitigated by placing different colors at non-uniform locations within each LED module and between LED modules. The rearrangement may compensate for the impact of wavelength dependency on beam angle and/or differences in different color LED characteristics. FIG. 5 illustrates top view of a luminaire, in accordance with some examples. The luminaire 500 of FIG. 5, contains multiple clusters 514 of LEDs 512 of different colors disposed on a substrate 502 (e.g., a PCB) each under a different optic 510. Each of the colors in different cluster of LEDs 512 may be oriented differently. For example, the LED placement may be rotated within each cluster 514 of LEDs 512 relative to other clusters 514 so that each color forms an overall symmetric arrangement (over the entirety of the luminaire 500). That is, as shown, in FIG. 5, each cluster 514 is disposed equidistant from a center of the luminaire 500, n (shown as 6 in FIG. 5) clusters 514 are disposed proximate to the perimeter of the luminaire 500 and separated from adjacent clusters 514 by substantially identical angles, and each color LED 512 is rotated within the clusters 514 by 360°/n (shown as 60° in FIG. 5) from the location of the corresponding color in the adjacent clusters 514. Other symmetrical arrangements are similarly apparent. When assessing the position of each color LED 512 relative to its optic 510, the average of each color is the same. In some embodiments, the LEDs 512 occupy a unique orientation in each cluster 514.

Figure 6A:
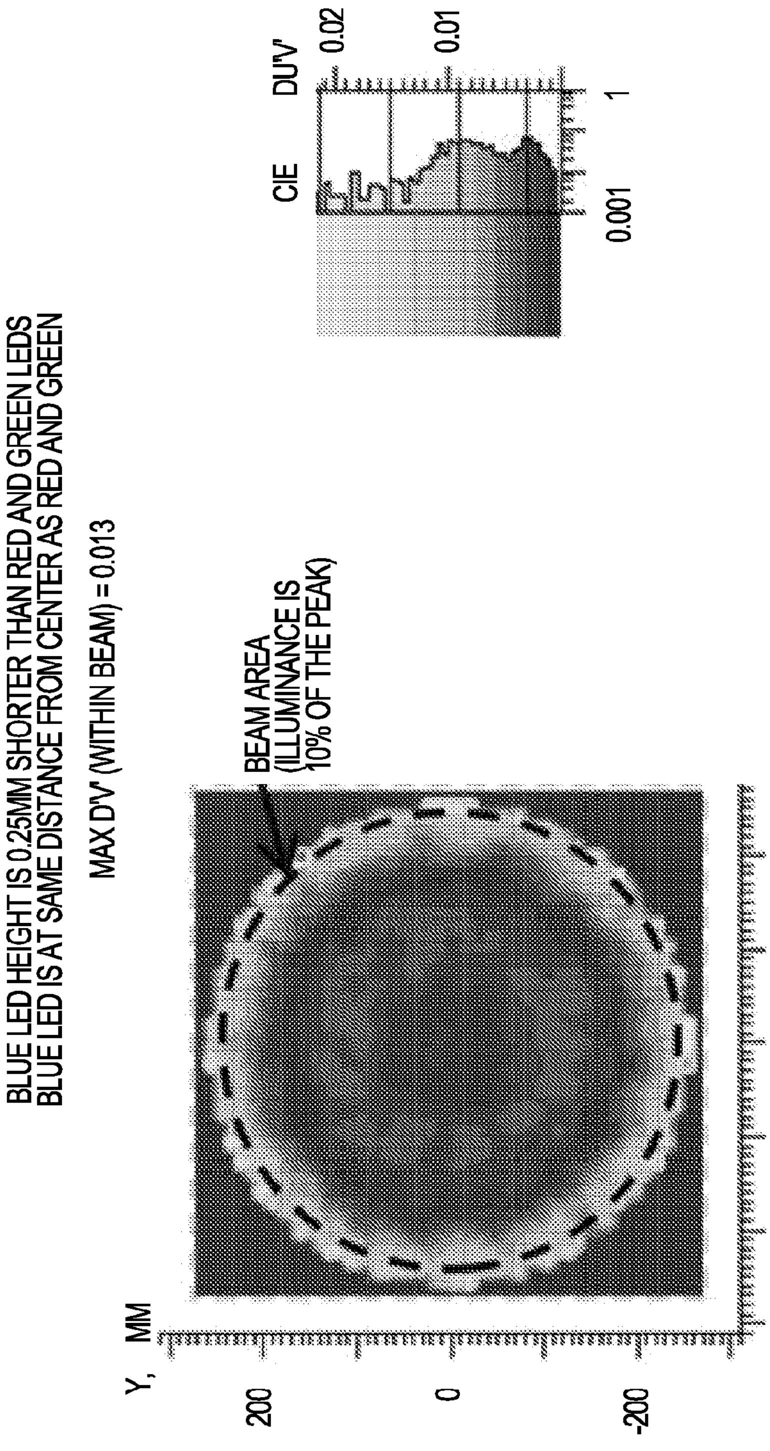
FIG. 6A illustrates a maximum $D_{uv}$ of a luminaire with equidistant LEDs in accordance with some embodiments.
Figure 6B:
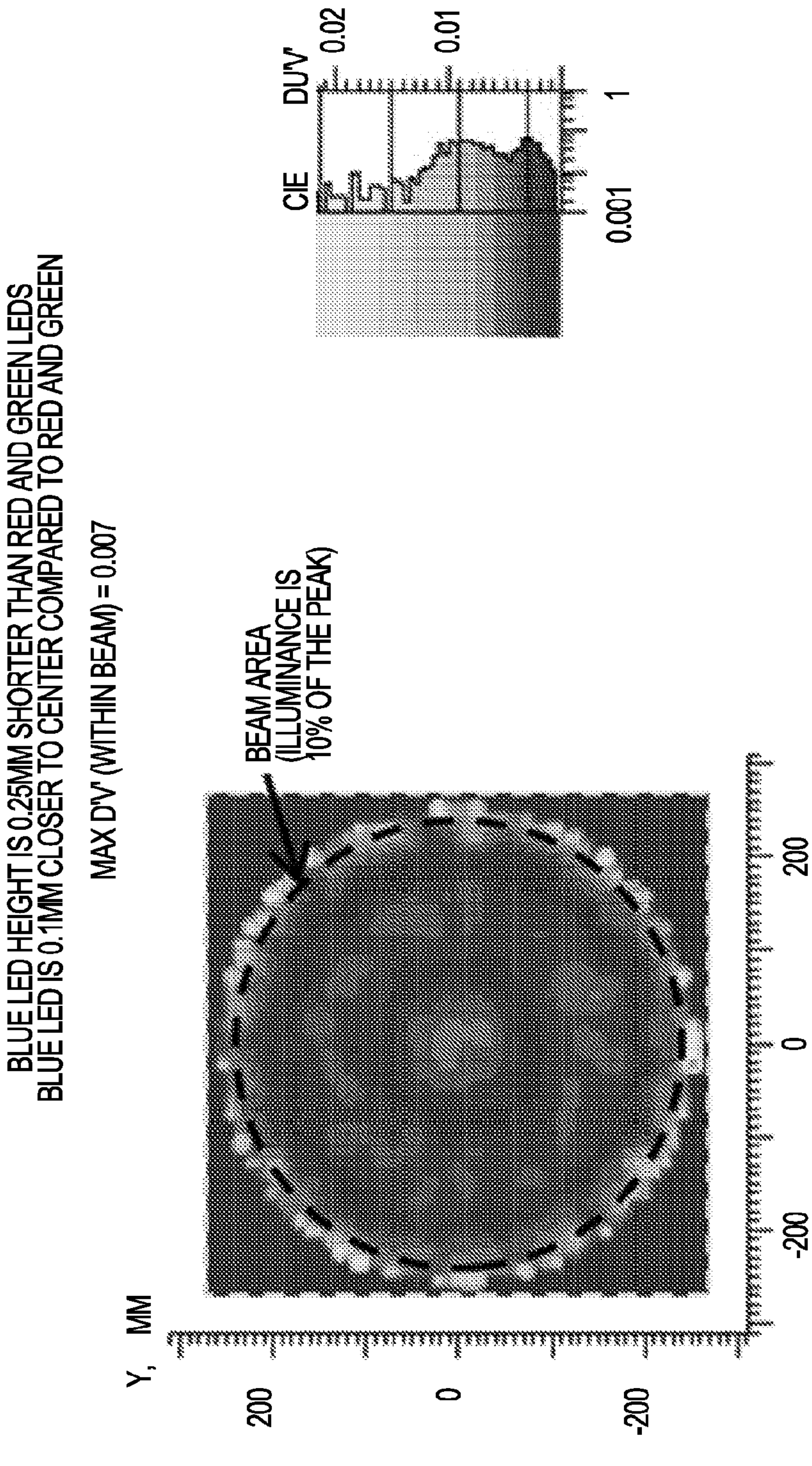
FIG. 6B illustrates a maximum $D_{uv}$ of a luminaire with non-equidistant LEDs in accordance with some embodiments.

In some embodiments, the intensities, colors, correlated color temperatures, values of $D_{uv}$ (which indicates the distance of a light color point from the black body curve), values of color-rendering index (CRI), etc. of the luminaire 500 may be based on user input. FIGS. 6A and 6B show the color error for different luminaires. The color error in $D_{uv}$ ($D_{u'v'}$) on a target surface at 1 meter from the luminaire 500 using the configuration of FIG. 5 has a smaller $D_{u'v'}$ number than other luminaires, indicating better color uniformity of the luminaire 500 shown in FIG. 5. FIG. 6A illustrates a maximum $D_{uv}$ of a luminaire with equidistant LEDs in accordance with some embodiments. FIG. 6B illustrates a maximum $D_{u'v'}$ of a luminaire with non-equidistant LEDs in accordance with some embodiments. FIG. 6B corresponds to the LED module 200 shown in FIG. 2. In FIG. 6A, the blue LED is shorter (by about 0.25 mm) than the red and green LEDs (as shown in FIGS. 3A-3D) and the LEDs within the LED module are equidistant from the center of the LED module, resulting in a maximum $D_{u'v'}$ within the beam of about 0.013 (the lightest regions near the dotted circle). In FIG. 6B, the blue LED is again shorter than the red and green LEDs but the blue LED is 0.1 mm closer to the center of the LED module than the red and green LEDs, resulting in a maximum $D_{u'v'}$ within the beam of about 0.007—i.e., a substantial improvement in the $D_{u'v'}$ compared with the luminaire of FIG. 6A.

Figure 7:
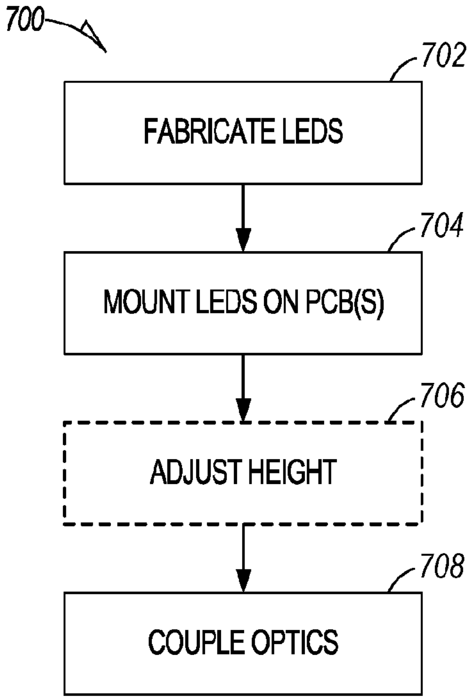
FIG. 7 illustrates a simplified flow diagram of a method of fabricating an LED structure in accordance with some embodiments.

FIG. 7 illustrates a simplified flow diagram of a method of fabricating an LED structure in accordance with some embodiments. Note that only some operations of the method 700 are shown; other operations may be present but are not shown for convenience. At operation 702, the LEDs may be fabricated on one or more substrates. In some embodiments, LEDs of each color may be grown and fabricated on different substrates using conventional techniques, and subsequently cleaved into individual LEDs or sets of LEDs to be further processed. In other embodiments, at least some of the LEDs of different colors may be fabricated on the same substrate, and subsequently cleaved into individual LEDs or sets of LEDs to be further processed.

After fabrication of the LEDs, the LEDs may be mounted on (or otherwise electrically connected to) one or more PCBs at operation 704.

Contacts may be fabricated on the semiconductor structure and connected to the LEDs through wirebond, copper (Cu) pillars, or solder bumping that uses through silicon vias (TSV), for example. The contacts may connect the LEDs to drivers, switches, and other electronic components on or off the one or more PCBs. The relative colors of each LED module may be disposed in different positions between LED modules (e.g., rotated and relative placement) in the overall arrangement of LED modules.

At operation 706, in some embodiments one or more of the LEDs after mounting on the one or more PCBs may have emission surfaces that are substantially non-planar. This may occur as the profiles of different colors of LEDs may differ, as shown in FIGS. 3A-3D. In such cases, the LEDs having emission surfaces that are lower may be mounted on one or more additional PCBs or otherwise height adjusted such that the emission surfaces of all of the LEDs (e.g., within an LED module) are substantially planar. In other embodiments, adjusting the height may be avoided due, e.g., to cost and fabrication issues.

At operation 708, the optics are coupled to the LEDs. As above, a single optic may be used to cover a corresponding LED module that contains all of the LED colors. In other embodiments, multiple LED modules may be disposed under a single optic.

Examples

Example 1 is an illumination device comprising: a light-emitting diode (LED) structure comprising a plurality of LED clusters, each cluster containing LEDs configured to emit light of a different color, and in each LED cluster, a center of at least one LED within the LED cluster is disposed at a different distance from a center of the LED cluster than a center of at least one other LED within the LED cluster.

In Example 2, the subject matter of Example 1 includes, a plurality of optics, each optic associated with a different LED cluster and configured to provide light from the LED cluster.

In Example 3, the subject matter of Example 2 includes, wherein in each LED cluster, the center of the LED cluster is aligned with an axis of symmetry of the optic.

In Example 4, the subject matter of Examples 2-3 includes, wherein in each LED cluster, a difference of distances between the center of the at least one LED and the center of the LED cluster and the center of the at least one other LED and the center of the LED cluster is dependent on a wavelength dependence of the optic.

In Example 5, the subject matter of Example 4 includes, wherein the difference of the distances is further dependent on a difference in heights of emission surfaces of the at least one LED and the at least one other LED.

In Example 6, the subject matter of Examples 1-5 includes, for each LED cluster, a total internal reflectance (TIR) structure containing a cavity in which the LED cluster is disposed, the TIR structure having a shape configured to direct light from the LED cluster to an exit surface using TIR.

In Example 7, the subject matter of Example 6 includes, an optic disposed in a recess in the exit surface of the TIR structure.

In Example 8, the subject matter of Examples 6-7 includes, an optic formed as the exit surface of the TIR structure.

In Example 9, the subject matter of Examples 1-8 includes, wherein for each color, the LEDs of the LED clusters that are configured to emit the color occupy a unique relative position within each LED cluster.

In Example 10, the subject matter of Examples 1-9 includes, wherein for each color, an average position of the LEDs of the LED clusters that are configured to emit the color within the LED clusters and an average position of the LEDs configured to emit each other color within the LED clusters are identical.

In Example 11, the subject matter of Examples 1-10 includes, wherein centers of the LEDs are disposed at about 120° from each other.

Example 12 is a luminaire comprising: a light-emitting diode (LED) structure comprising a plurality of LED clusters and an optic associated with each LED cluster, each LED cluster containing individual LEDs disposed on a printed circuit board (PCB), the LEDs in each LED cluster configured to emit light of a different color toward the optic associated with the LED cluster, and in each LED cluster, a center of at least one LED within the LED cluster is disposed at a different distance from a center of the LED cluster than a center of at least one other LED within the LED cluster.

In Example 13, the subject matter of Example 12 includes, wherein the center of the LED cluster is aligned with an axis of symmetry of the optic.

In Example 14, the subject matter of Examples 12-13 includes, wherein in each LED cluster, a difference of distances between the center of the at least one LED and the center of the LED cluster and the center of the at least one other LED and the center of the LED cluster is dependent on a wavelength dependence of the optic.

In Example 15, the subject matter of Example 14 includes, wherein the difference of the distances is further dependent on a difference in heights of emission surfaces of the at least one LED and the at least one other LED.

In Example 16, the subject matter of Examples 12-15 includes, in each LED cluster, a total internal reflectance (TIR) structure containing a cavity in which the LED cluster is disposed, the TIR structure having a shape configured to direct light from the LED cluster to an exit surface using TIR.

In Example 17, the subject matter of Examples 12-16 includes, wherein for each color, the LEDs of the LED clusters that are configured to emit the color occupy a unique relative position within each LED cluster.

In Example 18, the subject matter of Examples 12-17 includes, wherein for each color, an average position of the LEDs of the LED clusters that are configured to emit the color within the LED clusters and an average position of the LEDs configured to emit each other color within the LED clusters are identical.

Example 19 is a method of forming a light-emitting diode (LED) structure, the method comprising: connecting a plurality of LED clusters to a printed circuit board (PCB), each LED cluster including individual LEDs configured to emit light of a different color, and, in each LED cluster: the LEDs in the LED cluster are configured to emit light of a different color, and a center of at least one LED within the LED cluster is disposed at a different distance from a center of the LED cluster than a center of at least one other LED within the LED cluster; introducing each LED cluster to a cavity in a different total internal reflectance (TIR) structure, the TIR structure having a shape configured to direct light from the LED cluster to an exit surface of the TIR structure using TIR; and providing an optic in the exit surface of each TIR structure to guide the light from the LEDs in the cavity of the TIR structure to exit the LED structure.

In Example 20, the subject matter of Example 19 includes, wherein for each color, an average position of the LEDs of the LED clusters that are configured to emit the color within the LED clusters and an average position of the LEDs configured to emit each other color within the LED clusters are identical.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

While only certain features of the system and method have been illustrated and described herein, many modifications and changes will occur to those skilled in the art. It is, therefore, to be understood that the appended claims are intended to cover all such modifications and changes. Method operations may be performed substantially simultaneously or in a different order.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An illumination device comprising:

a light-emitting diode (LED) structure comprising a plurality of LED clusters, each LED cluster containing LEDs and associated with a corresponding optic of a plurality of optics, and in each LED cluster:

a first LED is configured to emit light of a first color, a second LED is configured to emit light of a second color that is different from the first color, a third LED is configured to emit light of a third color that is different from the first color and the second color, at least one of the first LED, the second LED, and the third LED has a height, measured from a mounting surface to a light emission surface of the at least one of the first LED, the second LED, and the third LED, that is different than a height of at least one other of the first LED, the second LED, and the third LED, lines between a first center of the first LED, a second center of the second LED, and a third center of the third LED form a non-equilateral triangle, a first distance between the first center of the first LED and the second center of the second LED, a second distance between the second center of the second LED and the third center of the third LED, and a third distance between the first center of the first LED and the third center of the third LED are not all equal, at least one of the first distance, second distance, or third distance is selected to compensate for a difference in heights of the first LED, the second LED, and the third LED at endpoints of the at least one of the first distance, second distance, or third distance such that a color non-uniformity in a beam emitted from the LED cluster is reduced relative to an arrangement in which the first distance, second distance, and third distance are all equal, and a lowest LED of the first LED, the second LED, and the third LED having a lowest light emission surface, measured from the mounting surface, is positioned at a first lateral distance from an axis of symmetry of the corresponding optic that is less than a second lateral distance from the axis of symmetry of the corresponding optic to at least one higher LED of the first LED, the second LED, and the third LED having a higher light emission surface than the lowest light emission surface, the first lateral distance and the second lateral distance being measured in a plane perpendicular to the axis of symmetry of the corresponding optic.

2. The illumination device of claim 1, wherein each optic is configured to provide light from a corresponding LED cluster through total internal reflection.

3. The illumination device of claim 1, wherein in each LED cluster, a center of the LED cluster is aligned with an axis of symmetry of the corresponding optic.

4. The illumination device of claim 2, wherein in each LED cluster, at least one of the first distance, the second distance, and the third distance is further selected to compensate for a difference in beam angles of light of the first color, the second color, and the third color transmitted through the corresponding optic associated with the LED cluster due to a wavelength-dependent transmission property of the corresponding optic.

5. The illumination device of claim 1, further comprising, for each LED cluster, a corresponding total internal reflectance (TIR) structure containing a cavity in which the LED cluster is disposed, the corresponding TIR structure having a shape configured to direct light from the LED cluster to an exit surface of the corresponding TIR structure using TIR.

6. The illumination device of claim 5, wherein the corresponding optic is disposed in a recess in the exit surface of the corresponding TIR structure.

7. The illumination device of claim 5, wherein the corresponding optic is formed as the exit surface of the corresponding TIR structure.

8. The illumination device of claim 5, wherein:

the TIR structure is formed from a material that is substantially transparent to the first color, the second color, and the third color, and the TIR structure comprises sidewalls that are angled such that light from the first LED, the second LED, and the third LED impinging on the sidewalls undergoes total internal reflection within the TIR structure and is directed toward the exit surface.

9. The illumination device of claim 1, wherein in each LED cluster, the first lateral distance and the second lateral distance are selected such that an output beam from the corresponding optic exhibits reduced color non-uniformity relative to an output beam from a corresponding arrangement in which the first LED, the second LED, and the third LED are positioned at equal lateral distances from the axis of symmetry of the corresponding optic.

10. The illumination device of claim 1, wherein for each color, an average position of the LEDs of the LED clusters that are configured to emit the color taken across the plurality of LED clusters and measured relative to the corresponding optic of each LED cluster, is identical to an average position of the LEDs configured to emit each other color taken across the plurality of LED clusters and measured relative to the corresponding optic of each LED cluster.

11. The illumination device of claim 1, wherein:

each optic has a focal length, and the focal length is greater than a first optic distance from the corresponding optic to an emission surface of a shortest of the first LED, the second LED, and the third LED measured from a surface on which the first LED, the second LED, and the third LED are mounted and is less than a second optic distance from the corresponding optic to an emission surface of a tallest of the first LED, the second LED, and the third LED measured from the surface on which the first LED, the second LED, and the third LED are mounted.

12. The illumination device of claim 1, wherein the first LED, the second LED, and the third LED of each cluster consist of a red LED configured to emit red light, a green LED configured to emit green light, and a blue LED configured to emit blue light.

13. The illumination device of claim 1, wherein the plurality of LED clusters is arranged such that, for the first color, a first average position of the first LEDs of the plurality of LED clusters relative to the corresponding optics is identical to a second average position of the second LEDs of the plurality of LED clusters relative to the corresponding optics and to a third average position of the third LEDs of the plurality of LED clusters relative to the corresponding optics.

14. A luminaire comprising:

a light-emitting diode (LED) structure comprising a plurality of LED clusters and a plurality of optics, each LED cluster of the plurality of LED clusters associated with a corresponding optic of the plurality of optics, each LED cluster containing individual LEDs disposed on a printed circuit board (PCB), the LEDs in each LED cluster configured to emit light of a different color toward the corresponding optic, and in each LED cluster:

a first LED is configured to emit light of a first color, a second LED is configured to emit light of a second color that is different from the first color, a third LED is configured to emit light of a third color that is different from the first color and the second color, at least one of the first LED, the second LED, and the third LED has a height, measured from a mounting surface to a light emission surface of the at least one of the first LED, the second LED, and the third LED, that is different than a height of at least one other of the first LED, the second LED, and the third LED, lines between a first center of the first LED, a second center of the second LED, and a third center of the third LED form a non-equilateral triangle, a first distance between the first center of the first LED and the second center of the second LED, a second distance between the second center of the second LED and the third center of the third LED, and a third distance between the first center of the first LED and the third center of the third LED are not all equal, at least one of the first distance, the second distance, or the third distance is selected to compensate for a difference in heights of the first LED, the second LED, and the third LED at endpoints of the at least one of the first distance, the second distance, or the third distance such that a color non-uniformity in a beam emitted from the LED cluster through the optic is reduced relative to an arrangement in which the first distance, second distance, and third distance are all equal, and a lowest LED of the first LED, the second LED, and the third LED having a lowest light emission surface, measured from the mounting surface, is positioned at a first lateral distance from an axis of symmetry of the corresponding optic that is less than a second lateral distance from the axis of symmetry of the corresponding optic to at least one higher LED of the first LED, the second LED, and the third LED having a higher light emission surface than the lowest light emission surface, the first lateral distance and the second lateral distance being measured in a plane perpendicular to the axis of symmetry of the corresponding optic.

15. The luminaire of claim 14, wherein in each LED cluster, a center of the LED cluster is aligned with an axis of symmetry of the corresponding optic.

16. The luminaire of claim 14, wherein in each LED cluster, at least one of the first distance, the second distance, and the third distance is further selected based on further selected to compensate for a difference in beam angles of light of the first color, the second color, and the third color transmitted through the corresponding optic associated with the LED cluster due to a wavelength-dependent transmission property of the corresponding optic.

17. The luminaire of claim 14, wherein in each LED cluster, the first lateral distance and the second lateral distance are selected such that an output beam from the corresponding optic exhibits reduced color non-uniformity relative to an output beam from a corresponding arrangement in which the first LED, the second LED, and the third LED are positioned at equal lateral distances from the axis of symmetry of the corresponding optic.

18. The luminaire of claim 14, wherein for each color, an average position of the LEDs of the LED clusters that are configured to emit the color taken across the plurality of LED clusters and measured relative to the corresponding optic of each LED cluster, is identical to an average position of the LEDs configured to emit each other color taken across the plurality of LED clusters and measured relative to the corresponding optic of each LED cluster.

19. A method of forming a light-emitting diode (LED) structure, the method comprising:

connecting a plurality of LED clusters to a printed circuit board (PCB), each LED cluster including a first LED configured to emit light of a first color, a second LED configured to emit light of a second color that is different from the first color, and a third LED configured to emit light of a third color that is different from the first color and the second color, and in each LED cluster:

at least one of the first LED, the second LED, and the third LED has a height, measured from a mounting surface to a light emission surface of the at least one of the first LED, the second LED, and the third LED, that is different than a height of at least one other of the first LED, the second LED, and the third LED, lines between a first center of the first LED, a second center of the second LED, and a third center of the third LED form a non-equilateral triangle, a first distance between the first center of the first LED and the second center of the second LED, a second distance between the second center of the second LED and the third center of the third LED, and a third distance between the first center of the first LED and the third center of the third LED are not all equal, and at least one of the first distance, second distance, or third distance is selected to compensate for a difference in heights of the first LED, second LED, and third LED at endpoints of the at least one of the first distance, the second distance, or the third distance such that a color non-uniformity in a beam emitted from the LED cluster is reduced relative to an arrangement in which the first distance, the second distance, and the third distance are all equal;

introducing each LED cluster to a cavity in a corresponding total internal reflectance (TIR) structure of a plurality of TIR structures, the corresponding TIR structure having a shape configured to direct light from the LED cluster to an exit surface of the corresponding TIR structure using TIR;

providing a corresponding optic of a plurality of optics in the exit surface of each corresponding TIR structure to guide the light from the at least one of the first LED, the second LED, and the third LED in the cavity of the corresponding TIR structure to exit the LED structure; and arranging each LED cluster of the plurality of LED clusters such that, in each LED cluster, a lowest LED of the first LED, the second LED, and the third LED having a lowest light emission surface, measured from the mounting surface, is positioned at a first lateral distance from an axis of symmetry of the corresponding optic that is less than a second lateral distance from the axis of symmetry of the corresponding optic to at least one other higher LED of the first LED, the second LED, and the third LED having a higher light emission surface than the lowest light emission surface, the first lateral distance and the second lateral distance being measured in a plane perpendicular to the axis of symmetry of the corresponding optic.

20. The method of claim 19, wherein for each color, an average position of the LEDs of the LED clusters that are configured to emit the color taken across the plurality of LED clusters and measured relative to the corresponding optic of each LED cluster, is identical to an average position of the LEDs configured to emit each other color taken across the plurality of LED clusters and measured relative to the corresponding optic of each LED cluster.

* * * * *